United States Patent

Sato et al.

[11] Patent Number: 6,044,119
[45] Date of Patent: Mar. 28, 2000

[54] FREQUENCY CONTROL METHOD AND CIRCUIT EMPLOYING BOTH REFERENCE SYMBOLS AND INFORMATION SYMBOLS

[75] Inventors: Shinichi Sato; Hideki Ishizuki, both of Tokyo, Japan

[73] Assignee: Oki Electric Industry Co., Ltd., Tokyo, Japan

[21] Appl. No.: 08/946,252

[22] Filed: Oct. 7, 1997

[30] Foreign Application Priority Data

Feb. 21, 1997 [JP] Japan ................................. 9-037696

[51] Int. Cl.[7] .................................................. H04L 27/06
[52] U.S. Cl. .................................... 375/344; 455/255
[58] Field of Search ................................ 375/344, 349, 375/326, 329, 200, 206; 455/230, 255, 257, 182.2, 182.1, 303; 329/307

[56] References Cited

U.S. PATENT DOCUMENTS

| 4,575,723 | 3/1986 | Turner et al. ........................... 342/159 |
| 5,619,524 | 4/1997 | Ling et al. ............................... 375/200 |

OTHER PUBLICATIONS

"A Study on Automatic Frequency Control for Spread Spectrum Mobile Radio Communication", Technical Report of the Institute Electronics, Information, and Communication Engineers of Japan, RCS96–105, Nov. 1996, pp. 45–50.

Digital Mobile Telecommunication, pp. 64–65, published on Feb. 25, 1988 by Kabushiki Kaisha Nihon Kogyo Gijutsu Center.

*Primary Examiner*—Don N. Vo
*Assistant Examiner*—Phuong Phu
*Attorney, Agent, or Firm*—Wenderoth, Lind & Ponack, L.L.P.

[57] ABSTRACT

The frequency of a local oscillator is controlled by demodulating a received signal to obtain received symbol values, determining the data value represented by each received symbol value, removing the data values from the received symbol values, and calculating a frequency adjustment from the remaining values. The received signal has reference symbols with known values interspersed among information symbols. The data values of information symbols are determined by a hard-decision process. Received symbol values are preferably obtained for multiple paths, the frequency adjustment being calculated by combining results for different paths.

24 Claims, 4 Drawing Sheets

FREQUENCY CONTROL METHOD AND CIRCUIT EMPLOYING BOTH REFERENCE SYMBOLS AND INFORMATION SYMBOLS

BACKGROUND OF THE INVENTION

The present invention relates to a frequency control circuit for controlling the frequency of a local oscillator.

More particularly, the invention addresses frequency control problems encountered in a mobile station in a spread-spectrum communication system. The local oscillator in the mobile station generates a local carrier signal that is used in demodulating a signal received from a base station. Accurate demodulation requires that the frequency of the local carrier signal closely match the carrier frequency of the received signal, but size and cost constraints prevent the use of a highly stable local oscillator, and in any case, the motion of the mobile station may introduce a variable Doppler frequency offset. The frequency offset between the received carrier signal and locally generated carrier signal must therefore be constantly monitored, and the frequency of the local must be controlled so as to keep the offset near zero.

One way to carry out the necessary frequency control is to have the base station transmit a pilot signal with a constant data value, providing the mobile station with a known reference against which the carrier frequency offset can be measured. In a Technical Report of the Institute of Electronics, Information and Communication Engineers of Japan (RCS95-105, pp. 34–50, November 1966), the inventors have proposed a frequency control circuit with a multipath frequency offset detector, which operates robustly, even under multipath fading conditions, by detecting frequency offset on each of a diversity of paths on which the pilot signal may be received.

Instead of devoting one communication channel to a pilot signal, however, a spread-spectrum mobile communication system may insert symbols with predetermined values at predetermined intervals in the transmitted data stream, to provide reference data for frequency control. Typically, these reference symbols are inserted at intervals of about one two-thousandth of a second (0.5 ms), that is, at a frequency of 1/(0.5 ms) or two kilohertz (2 kHz). If only the reference symbols are used, the sampling theorem requires that any frequency offset be limited to a range of one-half of 2 kHz, or 1 kHz; frequency offsets outside this range are in principle uncorrectable.

Spread-spectrum mobile communication systems are typically assigned carrier frequencies of about two gigahertz (2 GHz) in order to limit frequency offset to 1 kHz, and the local oscillator of a mobile station must be stable to within one-half of one part per million (0.5 ppm). This requirement is difficult to meet within the above-mentioned size and cost constraints.

SUMMARY OF THE INVENTION

It is accordingly an object of the present invention to control the frequency of a local oscillator accurately without relying on a pilot signal.

A further object of the invention is to control the frequency of a local oscillator accurately without relying on high frequency stability of the local oscillator.

Another object is to control the frequency of a local oscillator accurately despite multipath fading.

The invented method of controlling the frequency of a local oscillator relies on a received signal carrying a stream of information symbols, with reference symbols having predetermined values inserted at predetermined locations among the information symbols. The method comprises demodulating the received signal to obtain a received symbol value equal for each symbol, the received symbol value being equal to the transmitted symbol value altered by transmission channel effects and by frequency offset of the local oscillator;

determining a data value represented by each received symbol value, by making a hard decision for each information symbol, and using the predetermined value of each reference symbol;

removing the data value from the received symbol value, thereby obtaining a channel estimation value representing the transmission channel effects and frequency offset; and calculating, from the channel estimation value, a frequency adjustment to be applied to the local oscillator.

The steps of demodulating and removing are preferably carried out separately for each of a plurality of paths on which the signal is received, the frequency adjustment being calculated by combining the channel estimation values of the paths. In the step of determining a data value, for information symbols, a separate hard decision can be made for each path, but preferably, a single hard decision is made for all paths.

The invented frequency control circuit comprises a channel estimator that carries out the steps of demodulating, determining, and removing, and a frequency adjustment calculator that calculates the frequency adjustment.

By using both reference symbols and information symbols, the invented method and circuit can control the frequency of the local oscillator with substantially the same accuracy as if a pilot signal were used. The local oscillator does not need to have high frequency stability.

By obtaining separate channel estimation values for multiple paths, the invented method and circuit can control the frequency of the local oscillator accurately despite multipath fading.

DETAILED DESCRIPTION OF THE INVENTION

Exemplary embodiments of the invention will be described with reference to the attached drawings.

The embodiments will be described in the context of a spread-spectrum communication system of the code division multiple access (CDMA) type, in which the base station transmits a signal modulated by binary phase-shift keying (PSK). The transmitted signal comprises frames of Ns symbols each, among which the first Np symbols are reference symbols with predetermined values, and the remaining Ns–Np symbols contain the information to be transmitted. (Np and Ns are positive integers, Np<Ns.) The base station modulates the transmitted signal according to these information symbols and reference symbols, and also according to a spreading code. The chip rate of the spreading code is a multiple of the symbol rate, and the repeating period of the spreading code is equal to the frame length, or to a multiple thereof. This arrangement enables a mobile station to detect the positions of the reference symbols from their timing relationships to the spreading code.

Figure 1:
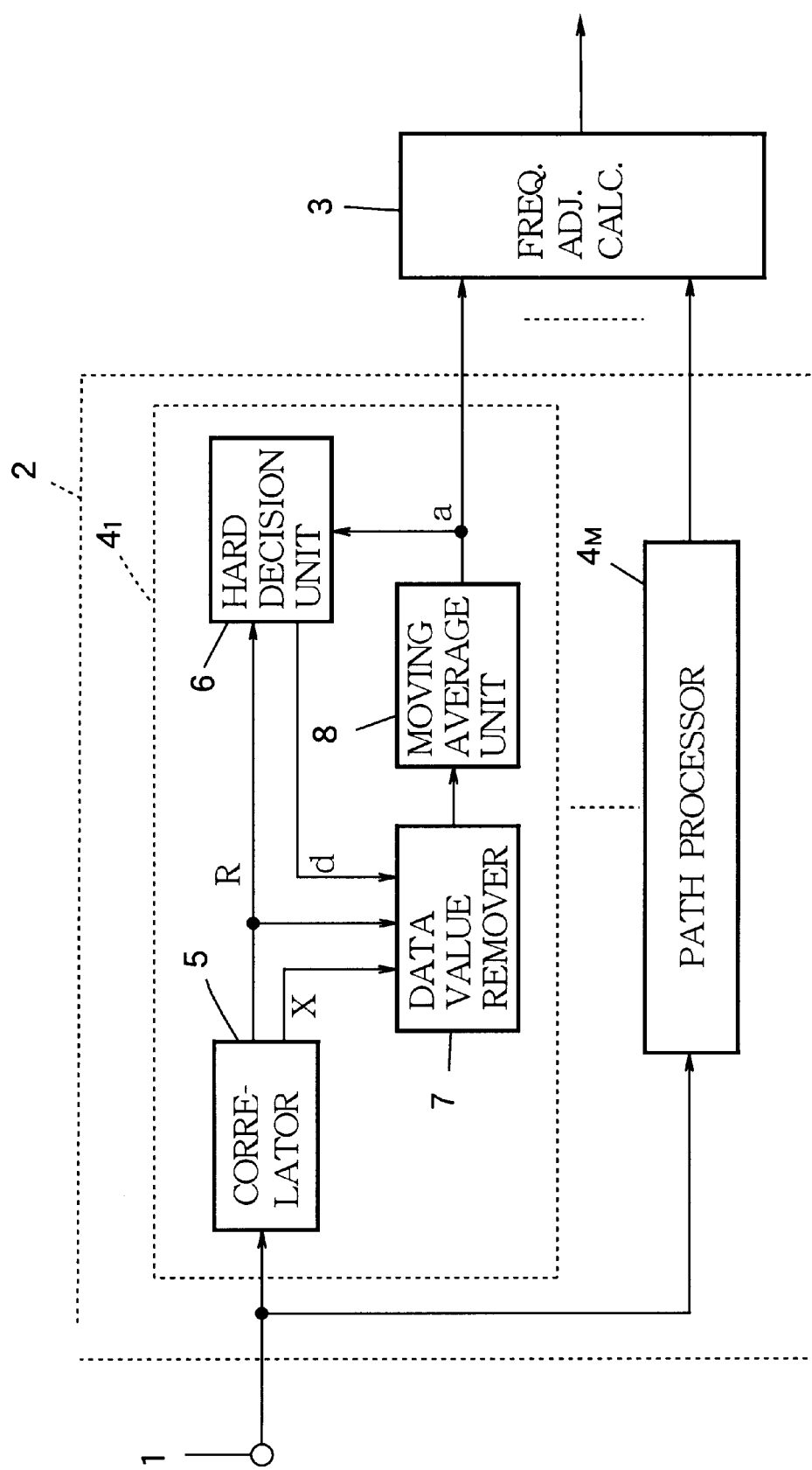
FIG. 1 is a block diagram of a first embodiment of the invention.

Referring to FIG. 1, the first embodiment is a frequency control circuit comprising an input terminal 1, a multipath channel estimator 2, and a frequency adjustment calculator (FREQ. ADJ. CALC.) 3. The multipath channel estimator 2 comprises M path processors, where M is an integer, greater than one, indicating the degree of path diversity. FIG. 1 shows only the first path processor $4_1$ and the M-th path processor $4_M$. Each path processor comprises a correlator 5, a hard-decision unit 6, a data value remover 7, and a moving-average unit 8.

In the following description, a path processor 4 with no subscript will mean any one of the M path processors $4_1$ to $4_M$. A similar convention will be followed below with respect to other reference numerals having subscripts.

All M path processors 4 receive the same complex-valued input signal, and each performs a separate channel estimation. The frequency adjustment calculator 3 calculates a frequency adjustment, the value of which is the output of the frequency control circuit, by combining the M channel estimation values received from the M path processors 4.

In a path processor 4, the correlator 5 correlates the complex-valued input signal with a spreading code, thereby producing a received symbol value (R) for each transmitted symbol. The correlator 5 also outputs an identification signal (X) indicating whether the current symbol is a reference symbol or an information symbol.

The hard-decision unit 6 obtains received symbol values (R) from the correlator 5 arid channel estimation values (a) from the moving-average unit 8, makes a hard decision as to the data value of each information symbol, and outputs the data value (d).

The data value remover 7 obtains the received symbol values (R) from the correlator 5, together with the identification signal (X) and the data values (d) of information symbols from the hard-decision unit 6, and outputs a modified symbol value (R') from which the data value has been removed, leaving only transmission-channel effects and frequency-offset effects. The modified symbol value (R') can be considered to be a one-symbol channel estimation value.

The moving-average unit 8 takes a moving average of these modified symbol values (R') over an interval of Np symbols, and outputs the result as the channel estimation value (a) used by the hard-decision unit 6 and frequency adjustment calculator 3.

The elements of the multipath channel estimator 2 comprise arithmetic and logic circuits, memory circuits, and other well-known circuits, detailed descriptions of which will be omitted.

Figure 2:
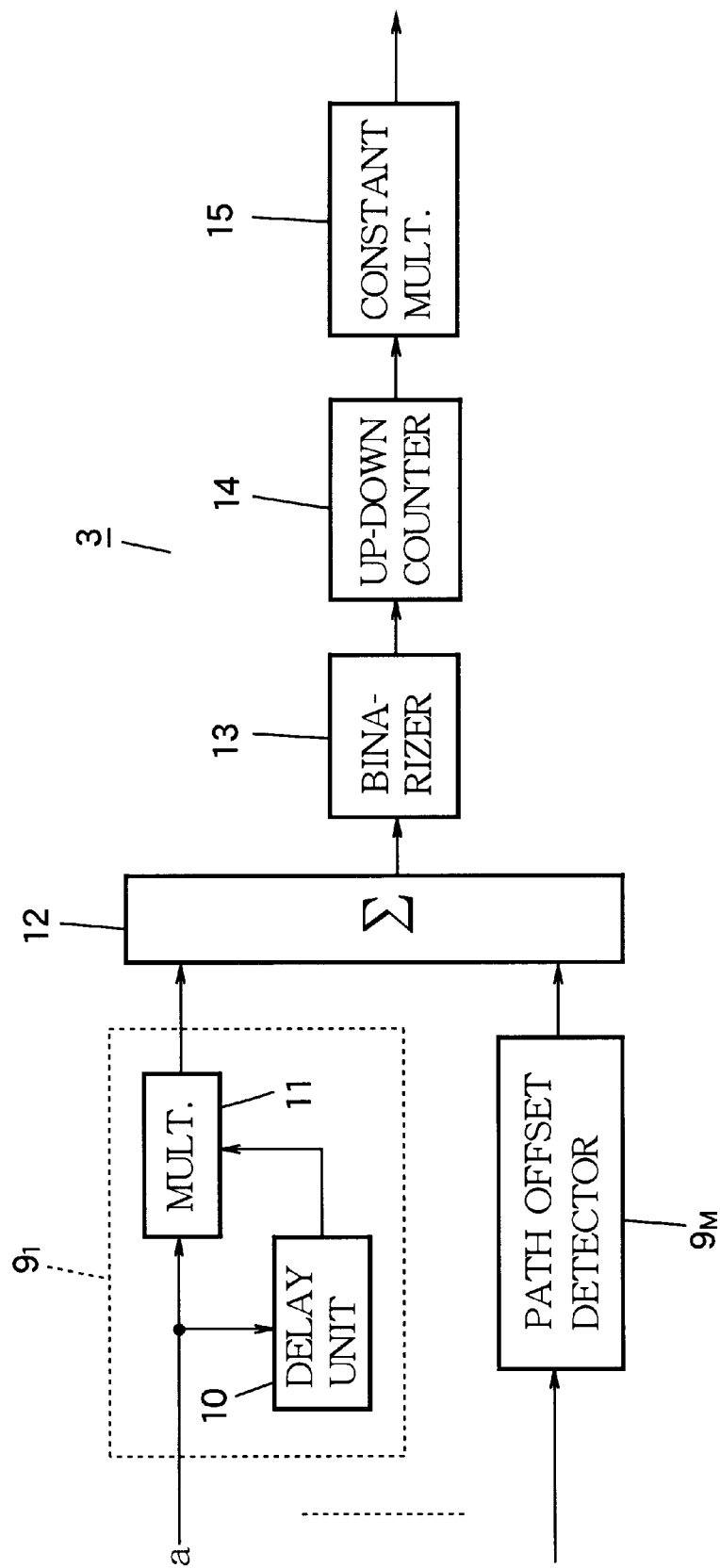
FIG. 2 is a block diagram of the frequency adjustment calculator in FIG. 1.

FIG. 2 shows an example of one possible internal configuration of the frequency adjustment calculator 3. In this example, for each of the M paths, the frequency adjustment calculator 3 has a path offset, detector 9 that receives the channel estimation value (a) produced by the corresponding path processor 4. FIG. 2 shows only the first path offset detector $9_1$ and M-th path offset detector $9_M$. Each path offset detector 9 comprises a delay unit 10 that delays the channel estimation value (a), arid a multiplier (MULT.) 11 that multiplies the complex conjugate of the delayed channel estimation value by the undelayed channel estimation value to produce a path frequency offset value.

The frequency adjustment calculator 3 in this example also comprises an adder 12, a binarizer 13, an up-down counter 14, and a constant multiplier 15.

The adder 12 takes the sum of the M path frequency offset values produced by the path offset detectors 9, thereby combining the M path frequency offset values into a single estimated frequency offset.

The binarizer 13 receives this estimated frequency offset and outputs a value indicating whether the estimated frequency offset is positive or negative.

The up-down counter 14 is initialized to a certain positive integer value C, and counts in a range from zero to 2C, counting up when the binarizer 13 reports a positive frequency offset, and down when the binarizer 13 reports a negative frequency offset. If the count reaches zero, the up-down counter 14 outputs a value of minus one (−1). If the count reaches 2C, the up-down counter 14 outputs a value of one (1). After output of either value (−1 or 1), the up-down counter 14 is initialized and starts counting again from C.

The constant multiplier 15 multiplies the value (−1 or 1) output from the up-down counter 14 by a constant Δ. The result (−Δ or Δ) is the output of the frequency control circuit, indicating an amount by which the frequency of the local oscillator is to be adjusted. Typically, a control voltage applied to the local oscillator is adjusted by −Δ or Δ.

The elements shown in FIG. 2 are well-known components of computing devices. Detailed descriptions will be omitted.

Next, the operation of the multipath channel estimator 2 will be described in mathematical terms.

The signal received at the input terminal 1 is a baseband signal that has already been demodulated or down-converted from a radio-frequency band by use of the local carrier signal output by the local oscillator. The baseband signal has in-phase and quadrature components, which are treated as the real and imaginary parts of a complex number.

Over a single symbol interval, the baseband signal comprises a single data value which has been multiplied at the base station by chips with values of plus or minus one, the chips constituting a one-symbol segment of the spreading code. By multiplying the baseband signal by the same spreading code and summing the results over one-symbol intervals, the correlator 5 in the multipath channel estimator 2 further demodulates the baseband signal and recovers the transmitted symbol values, except that the symbol values have been altered by channel noise and other transmission channel effects, and by the frequency offset of the local oscillator.

The received symbol value output by the correlator 5 for the n-th symbol can be approximately represented in the following form, where n is an integer, Ts is the duration of the symbol interval, A is the amplitude or gain characteristic of the path, θ is the phase delay characteristic of the path, Δf is the frequency offset of the local oscillator, d is the data value, exp is the exponential function, w(nTs) is a noise term, and j is the square root of minus one.

$$R(nTs)=A\exp[j(2\pi\Delta fnTs+\theta)]\exp(jd)+w(nTs)$$

The data value (d) is treated in this expression as being equal to zero or π. The term $A\exp[j(2\pi\Delta fnTs+\theta)]$ is substantially equal to the channel estimation value a(nTs) output at this time by the moving-average unit 8, as will be shown below. The hard-decision unit 6 determines the data value of an information symbol by multiplying R(nTs) by the complex conjugate of a(nTs), denoted a*(nTs), and deciding whether the real part of the result is positive or negative. If the noise term is ignored, the product of R(nTs) and a*(nTs) has the following expression.

$$R(nTs)A\exp[-j(2\pi\Delta fnTs+\theta)]=A^2\exp(jd)$$

The noise term and the inaccuracy of the channel estimation value will usually not be large enough to change the sign of the real part of $A^2\exp(jd)$, so the hard-decision unit 6 can usually determine the correct data value (d) in this way.

Figure 3:
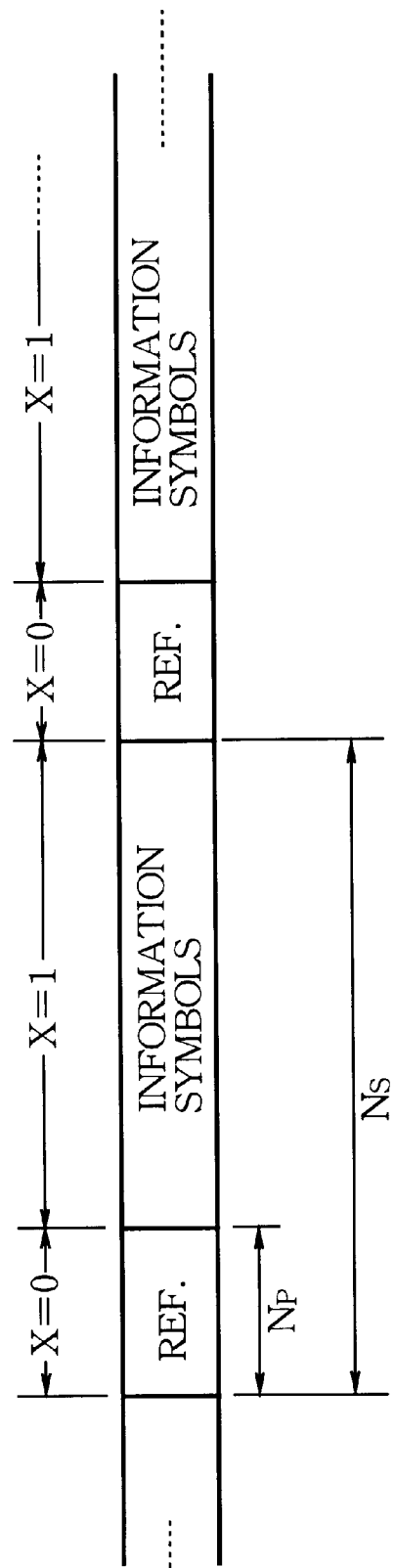
FIG. 3 is a data stream diagram illustrating the intervals at which reference symbols are inserted.

The correlators 5 in all of the path processors 4 use the same spreading code, but with different timing offsets, corresponding to the transmission delays on different signal paths. As noted above, the positions of reference symbols in the received symbol stream can be determined from the timing of the spreading code, enabling each correlator 5 to output an identification signal X. As shown in FIG. 3, the identification signal X has one value (for example, zero) for the Np reference symbols (REF.) at the beginning of each frame, and another value (for example, one) for the (Ns−Np) information symbols in remaining part of the frame.

When the identification signal X indicates a reference symbol, the data value remover 7 uses the predetermined value of the reference symbol as its data value (d). These predetermined data values are stored internally in the data value remover 7. When the identification signal X indicates an information symbol, the data value remover 7 uses the data value (d) supplied by the hard-decision unit 6.

The data value remover 7 removes the data value (d) from the received symbol value R(nTs) by multiplying R(nTs) by the complex conjugate of exp(jd). If the noise term w(nTs) is again ignored, the modified value R'(nTs) output by the data value remover 7 has the following expression.

$$R'(nTs)=R(nTs)\exp(-jd)=A\exp[j(2\pi\Delta fnTs+\theta)]$$

By taking a moving average of these modified symbol values R'(nTs) over Np symbols, the moving-average unit 8 reduces the effect of the noise term. If the path characteristics A and θ remain constant over the duration of the Np symbols in the moving average, and if the amplitude characteristic A is large enough for the averaged noise terms to be negligible in comparison, the expression Aexp[j(2π∆fnTs+θ)] closely approximates the channel estimation value a(nTs) output by the moving-average unit 8.

Typical values of Np and Ts are four symbols and 1/64000 s, making NpTs equal to one sixteen-thousandth of a second. Over an interval this short, or even several intervals this short, the path characteristics A and θ can be expected to remain substantially constant.

For the first Np symbols in a frame, which have known reference values, the possibility of an incorrect data value does not exist. Assuming sufficient amplitude A, by averaging these Np symbols, the data value remover 7 can obtain a reliably accurate channel estimation value a(nTs). This value can moreover be expected to remain valid for the next Np symbols as well, enabling the hard-decision unit 6 to obtain correct data values for those Np symbols. These correct values in turn enable the data value remover 7 to modify the received symbol values correctly, so that the moving-average unit 8 obtains accurate channel estimation values during the next Np symbols as well, enabling the hard-decision unit 6 to obtain further accurate data values. This process continues, normally enabling the moving-average unit 8 to produce accurate channel estimation values a(nTs) throughout the frame.

The channel estimation process is robust with respect to occasional data errors made by the hard-decision unit 6, because the moving average calculation in the moving average unit 8 reduces the effect of such errors. Moreover, even if the hard-decision unit 6 makes a burst of errors, causing the data value remover 7 to begin producing inaccurate channel estimates, accuracy will be restored at the beginning of the next frame, when known reference symbol values become available. The performance of the multipath channel estimator 2 accordingly approaches the level attained with a pilot signal, even though the transmitted symbol stream has only Np reference symbols per frame. The enhanced accuracy is due to the use of information symbols as well as reference symbols.

Next, the operation of the frequency adjustment calculator 3 will be described.

The M path offset detectors 9 operate identically on the M channel estimation values a(nTs) supplied by the multipath channel estimator 2. In each path offset detector 9, the delay unit 10 delays a(nTs) by N symbols, where N is a fixed positive integer, small enough that the path characteristics A and θ can be expected to remain substantially constant over a duration of N symbols. If the noise term w(nTs) is once again ignored, the multiplication operation performed by the multiplier 11 gives the following result, in which the path phase delay θ is eliminated.

$$a(nTs)a^*[(n-N)Ts] = A^2\exp(j2\pi\Delta fNTs)$$
$$= A^2[\cos(2\pi\Delta fNTs) + j\sin(2\pi\Delta fNTs)]$$

To obtain a path frequency offset value, the multiplier 11 outputs the imaginary component of this product. Using Im to denote the imaginary component, the following path frequency offset value is derived.

$$Im\{a(nTs)a^*[(n-N)Ts]\}=A^2\sin(2\pi\Delta fNTs)$$

The delay N can be chosen so that for all anticipated frequency offsets ∆f, the quantity 2π∆fNTs has an absolute value less than π/2. In this range, the sine function is a monotonic increasing function, equal to zero when ∆f is zero. For sufficiently small values of ∆f, $A^2\sin(2\pi\Delta fNTs)$ is substantially proportional to ∆f.

To estimate the frequency offset of the local oscillator, the adder 12 sums the path frequency offset values for all M paths. The received signal power $A^2$ may vary considerably from path to path, due to multipath fading. On paths with low received power ($A^2$), the resulting low signal-to-noise ratio makes the path frequency offset value unreliable, but these paths do not figure importantly in the sum output by the adder 12. The sum output by the adder 12 is determined mainly by the paths with high received power ($A^2$), which tend to have high signal-to-noise ratios and therefore produce more reliable path frequency offset values.

As described earlier, the up-down counter 14 is initialized to C, and counts up or down depending on whether the sum output by the adder 12 is positive or negative, continuing to count in this way until zero or 2C is reached.

If the actual frequency offset is zero, the adder 12 will tend to produce small positive and negative values at random, due to noise, and the count in the up-down counter 14 will tend to wander randomly around the initial value of C, without quickly reaching either zero or 2C.

If there is a positive frequency offset, the adder 12 will tend to produce positive values, driving the count upward. When the count reaches 2C, the constant multiplier 15 outputs a frequency adjustment value equal to the constant ∆, which is applied to the local oscillator and thereby reduces the frequency offset. The up-down counter 14 is re-initialized to C, and the same process is repeated until the frequency offset is reduced to substantially zero.

If there is a negative frequency offset, the adder 12 will tend to produce negative values, driving the count downward. When the count reaches zero, the constant multiplier 15 outputs a frequency adjustment value equal to $-\Delta$ which, when applied to the local oscillator, again reduces the frequency offset. This process is similarly repeated until the frequency offset is substantially zero.

The up-down counter 14 functions as a filter, preventing the frequency of the local oscillator from being adjusted too frequently in response to random noise.

As described above, the first embodiment performs frequency control accurately, because both reference symbols and information symbols are used, and is resistant to multipath fading, because frequency offset values obtained from M paths are combined.

If the actual number of signal paths is less than M, the path processors 4 and path offset detectors 9 corresponding to paths on which no signal is present can be turned off, to save power and eliminate extraneous noise from the output of the adder 12.

Next, a second embodiment will be described.

Figure 4:
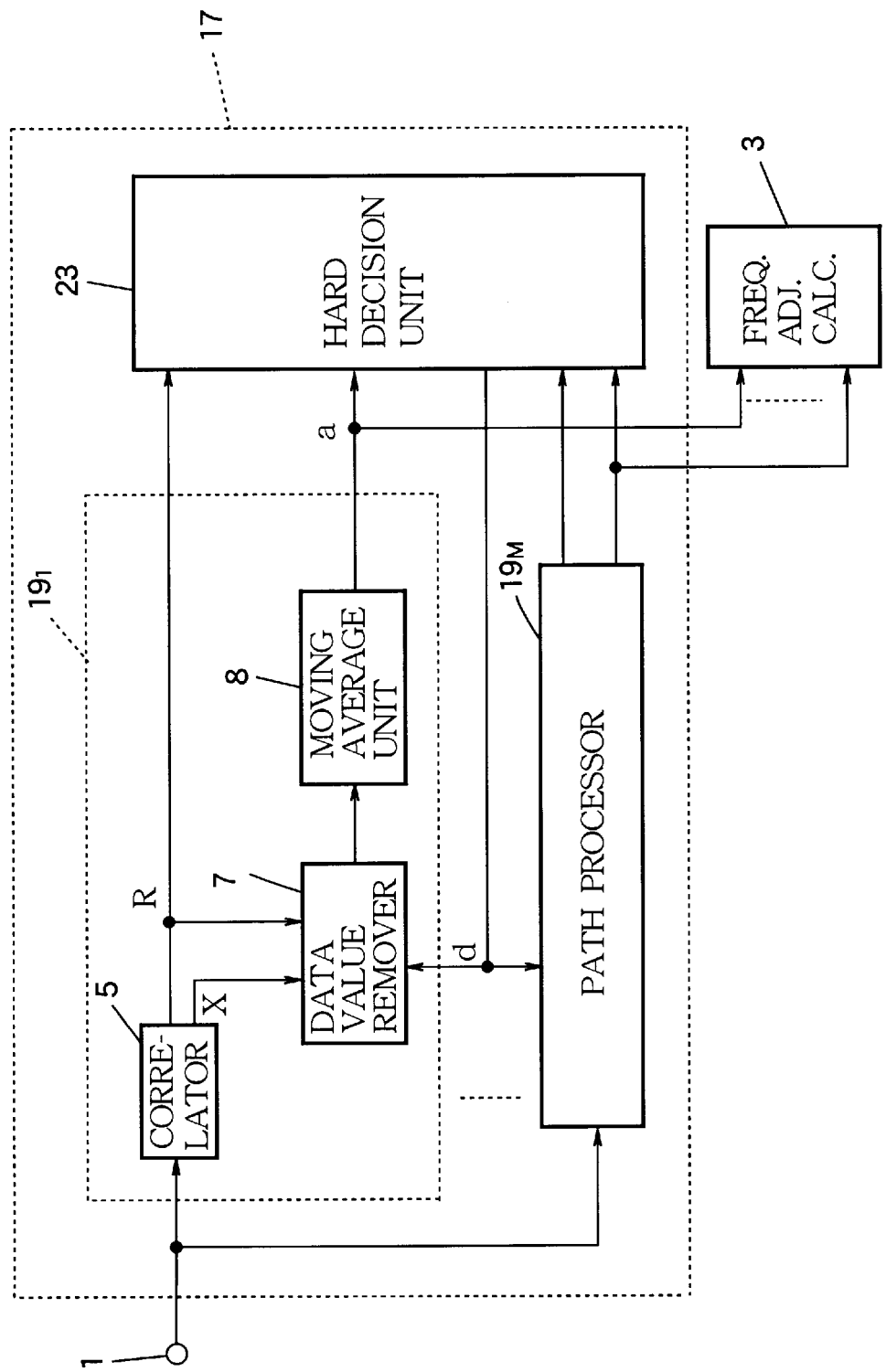
FIG. 4 is a block diagram of a second embodiment of the invention.

Referring to FIG. 4, the second embodiment comprises an input terminal 1, a multipath channel estimator 17, and a frequency adjustment calculator 3. The signal received at the input terminal 1 is the same complex-valued signal as in the first embodiment. The frequency adjustment calculator 3 is also the same as in the first embodiment.

The multipath channel estimator 17 comprises M path processors 19 and a single hard-decision unit 23. The drawing shows only the first path processor $19_1$ and last path processor $19_M$. Each path processor 19 supplies a channel estimation value (a) to the hard-decision unit 23 and to the frequency adjustment calculator 3. Each path processor 19 supplies a received symbol value (R) to the hard decision unit 23. The hard-decision unit 23 returns a single data value (d) to all of the path processors 19.

Each path processor 19 comprises a correlator 5, a data value remover 7, and a moving-average unit 8, which are identical to the corresponding elements in the first embodiment. The received symbol value (R), identification signal (X), and estimated channel value (a) have the same mathematical expressions as in the first embodiment.

The hard-decision unit 23 multiplies the received symbol value R(nTs) received from each path processor 19 by the complex conjugate a*(nTs) of the channel estimation value received from the same path processor 19, thereby obtains M products, adds these M products together, and determines the data value (d) according to whether the real part of the resulting sum is positive or negative. This enables the hard-decision unit 23 to determine the data value more accurately than the hard-decision units 6 in the first embodiment.

In particular, paths having a low received power level $A^2$ and a correspondingly low signal-to-noise ratio, which produce comparatively many incorrect data values in the first embodiment, contribute only slightly to the sum taken in the hard-decision unit 23. The main contributors to this sum are the paths with high received power levels $A^2$, which have higher signal-to-noise ratios; their contributions enable the lard-decision unit 23 to determine the data value (d) with comparatively high accuracy. The hard-decision unit 23 furnishes this accurate data value to the path processors 19 for all paths, enabling even the path processors 19 for paths with low signal-to-noise ratios to operate correctly.

The channel estimation values (a) for paths with low signal-to-noise ratios are accordingly more reliable in the second embodiment than in the first embodiment, enabling the frequency adjustment calculator 3 to determine the frequency offset on these paths more accurately, and improve the overall accuracy of the operation of the frequency control circuit.

As noted above, when employed in a mobile station of a spread-spectrum mobile communication system in which the base station transmits reference symbols at the beginning of each frame, the present invention enables the frequency of the mobile station's local oscillator to be controlled with substantially the same accuracy as if a pilot signal were employed, permitting the use of a comparatively small, low-cost local oscillator that need not have high frequency stability.

Use of the invention is not restricted to CDMA spread-spectrum systems, or to systems employing binary phase-shift keying. The invention is applicable to any communication system in which one station transmits data frames with reference symbols, of the general type shown in FIG. 3, to another station that uses a local oscillator in detecting the transmitted data.

A multipath channel estimator is desirable, particularly in mobile communication systems, but the invention can also be practiced with only a single path, in which case M is equal to one and the adder 12 in the frequency adjustment calculator 3 can be eliminated.

The invention can be practiced in either hardware or software, or in a combination of hardware and software.

Those skilled in the art will recognize that further variations are possible in the configuration and operation of the invention, within the limits of the scope claimed below.

What is claimed is:

1. A method of controlling a frequency of a local oscillator at a first station that uses the local oscillator to demodulate a signal received from a second station, the signal carrying a stream of information symbols, with reference symbols having predetermined values inserted at predetermined locations among the information symbols, said method comprising:

demodulating the signal to obtain, for each reference symbol and for each information symbol, a received symbol value equal to a symbol value transmitted by the second station, altered by transmission channel effects and by a frequency offset of the local oscillator;

determining a data value represented by each received symbol value, by making a hard decision based on the received symbol value of each information symbol, and by setting the data value represented by each reference symbol equal to the predetermined value of the reference symbol;

removing the data value from the received symbol value, thereby obtaining a channel estimation value representing the transmission channel effects and the frequency offset;

delaying the channel estimation value by a predetermined duration, during which a plurality of symbol values are received, thereby obtaining a delayed channel estimation value;

multiplying the channel estimation value by a complex conjugate of the delayed channel estimation value, thereby obtaining a complex product; and calculating, from an imaginary part of the complex product, a frequency adjustment to be applied to the local oscillator.

2. A method as claimed in claim 1, wherein the second station modulates the signal by phase-shift keying, and the received symbol value is a complex number having a real part representing an in-phase component of the signal and an imaginary part representing a quadrature component of the signal.

3. A method as claimed in claim 2, wherein said removing is carried out by multiplying the received symbol value by a complex conjugate of the data value.

4. A method as claimed in claim 1, wherein:
the signal is received on a plurality of paths;
said demodulating and said removing are carried out separately for each path, thereby yielding a corresponding plurality of channel estimation values; and
said calculating is carried out by combining the plurality of channel estimation values.

5. A method as claimed in claim 4, wherein said determining the data value is carried out, for the information symbols, by making a separate hard decision for each path.

6. A method as claimed in claim 4, wherein said determining the data value is carried out, for the information symbols, by making a single hard decision for all of the paths.

7. A method as claimed in claim 1, further comprising:
taking a moving average of the channel estimation value over a certain number of symbols, wherein said calculating is carried out by using the moving average.

8. A method as claimed in claim 7, wherein the reference symbols occur as groups of Np consecutive symbols, Np being a positive integer, and the moving average is taken over Np symbols.

9. A method as claimed in claim 7, wherein said determining the data value is carried out, for the information symbols, by removing the moving average from the received symbol value.

10. A method as claimed in claim 9, wherein:
the second station modulates the signal by phase-shift keying;
the received symbol value is a complex number having a real part representing an in-phase component of the signal and an imaginary part representing a quadrature component of the signal; and
said determining the data value is carried out, for the information symbols, by multiplying the received symbol value by a complex conjugate of the moving average.

11. A method as claimed in claim 1, wherein:
the signal is a spread-spectrum signal modulated by a spreading code; and
said demodulating comprises a correlating of the signal with the spreading code.

12. A method as claimed in claim 11, wherein the first station is a mobile station in a code division multiple access communication system.

13. A frequency control circuit operable to control a frequency of a local oscillator at a first station that uses the local oscillator to demodulate a signal received from a second station, the signal carrying a stream of information symbols, with reference symbols having predetermined values inserted at predetermined locations among the information symbols, said circuit comprising:
a channel estimator operable: to demodulate the signal to obtain, for each reference symbol and for each information symbol, a received symbol value equal to a symbol value transmitted by the second station, altered by transmission channel effects and by a frequency offset of the local oscillator; to determine a data value represented by each received symbol value, by making a hard decision based on the received symbol value of each information symbol and by setting the data value represented by each reference symbol equal to the predetermined value of the reference symbol; and to remove the data value from the received symbol value, thereby obtaining a channel estimation value representing the transmission channel effects and the frequency offset; and
a frequency adjustment calculator, coupled to said channel estimator, operable: to delay the channel estimation value by a predetermined duration during which a plurality of symbol values are received, thereby obtaining a delayed channel estimation value; to multiply the channel estimation value by a complex conjugate of the delayed channel estimation value, thereby obtaining a complex product; and to calculate, from an imaginary part of the complex product, a frequency adjustment to be applied to the local oscillator.

14. A circuit as claimed in claim 13, wherein the second station modulates the signal by phase-shift keying, and the received symbol value is a complex number having a real part representing an in-phase component of the signal and an imaginary part representing a quadrature component of the signal.

15. A circuit as claimed in claim 14, wherein said channel estimator removes the data value from the received symbol value by multiplying the received symbol value by a complex conjugate of the data value.

16. A circuit as claimed in claim 13, wherein:
the signal is received on a plurality of paths;
said channel estimator demodulates the signal and removes the data value separately for each path, thereby obtaining a corresponding plurality of channel estimation values; and
said frequency adjustment calculator calculates the frequency adjustment by combining the plurality of channel estimation values.

17. A circuit as claimed in claim 16, wherein said channel estimator determines the data value, for the information symbols, by making a separate hard decision for each path.

18. A circuit as claimed in claim 16, wherein said channel estimator determines the data value, for the information symbols, by making a single hard decision for all of the paths.

19. A circuit as claimed in claim 13, wherein:
said channel estimator takes a moving average of the channel estimation value over a certain number of symbols; and
said frequency adjustment calculator calculates the frequency adjustment by using the moving average.

20. A circuit as claimed in claim 19, wherein the reference symbols occur as groups of Np consecutive symbols, Np being a positive integer, and said channel estimator takes the moving average over Np symbols.

21. A circuit as claimed in claim 19, wherein said channel estimator determines the data value, for the information symbols, by removing the moving average from the received symbol value.

22. A circuit as claimed in claim 21, wherein:

the second station modulates the signal by phase-shift keying;

the received symbol value is a complex number having a real part representing an in-phase component of the signal and an imaginary part representing a quadrature component of the signal; and said channel estimator determines the data value, for the information symbols, by multiplying the received symbol value by a complex conjugate of the moving average.

23. A circuit as claimed in claim 13, wherein:

the signal is a spread-spectrum signal modulated by a spreading code; and said channel estimator demodulates the signal by correlating the signal with the spreading code.

24. A circuit as claimed in claim 23, wherein the first station is a mobile station in a code division multiple access communication system.

* * * * *